(12) United States Patent
Oba et al.

(10) Patent No.: US 10,222,801 B2
(45) Date of Patent: Mar. 5, 2019

(54) MOVEMENT ROUTE GENERATING APPARATUS AND MOVEMENT ROUTE GENERATING METHOD

(71) Applicant: ALPINE ELECTRONICS, INC., Shinagawa-ku, Tokyo (JP)

(72) Inventors: Hiroki Oba, Fukushima (JP); Kosuke Munakata, Fukushima (JP); Tetsuro Yabe, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/618,528

(22) Filed: Jun. 9, 2017

(65) Prior Publication Data

US 2018/0011489 A1    Jan. 11, 2018

(30) Foreign Application Priority Data

Jul. 7, 2016    (JP) .................................. 2016-135109

(51) Int. Cl.
*G05D 1/00*    (2006.01)
*G05D 1/02*    (2006.01)
(Continued)

(52) U.S. Cl.
CPC ........... *G05D 1/0088* (2013.01); *B60W 30/10* (2013.01); *B62D 15/025* (2013.01); *B62D 15/0285* (2013.01); *G05D 1/0212* (2013.01); *B60W 2550/146* (2013.01); *B60W 2710/207* (2013.01); *G05D 2201/0213* (2013.01)

(58) Field of Classification Search
CPC ... G05D 1/0088; G05D 1/0212; B60W 30/10; B62D 15/025; B62D 15/0285
See application file for complete search history.

(56) References Cited

U.S. PATENT DOCUMENTS 5,832,400 A * 11/1998 Takahashi .............. B60K 31/00
                                                                   701/53
7,099,758 B2    8/2006 Tanaka et al.
(Continued)

FOREIGN PATENT DOCUMENTS

JP           9-50596        2/1997
JP        2004-291866     10/2004
(Continued)

*Primary Examiner* — Behrang Badii
*Assistant Examiner* — Daniel L Greene
(74) *Attorney, Agent, or Firm* — Brinks Gilson & Lione

(57) ABSTRACT

A movement route generating apparatus includes an angle calculating unit calculating an angle formed by a vehicle travel direction at a target position compared with that at the current position, a graph generating unit generating a graph that has most gentle inclinations by plotting the curvature of a travel trajectory matching the steering angle of the vehicle and a distance traveled on two axes, under the condition that the area of a graph generated in correspondence to a travel trajectory from the current position to the target position is equal to the angle and other conditions, and a route setting unit setting a travel trajectory represented by the graph as the movement route of the vehicle. Accordingly, a travel trajectory with the smallest degree of change in curvature per unit distance traveled, that is, a low horizontal angular velocity caused by vehicle steering, can be set as a movement route.

20 Claims, 9 Drawing Sheets

(51) Int. Cl.
  *B60W 30/10* (2006.01)
  *B62D 15/02* (2006.01)

(56) References Cited

U.S. PATENT DOCUMENTS

| | | | | |
|---|---|---|---|---|
| 7,647,211 | B2* | 1/2010 | Drumheller | G06F 17/509 703/1 |
| 8,285,479 | B2* | 10/2012 | Kawabata | B60R 1/00 180/204 |
| 8,874,360 | B2* | 10/2014 | Klinger | G08G 1/162 701/22 |
| 2002/0134149 | A1* | 9/2002 | Shiraishi | B60C 19/00 73/146 |
| 2005/0234626 | A1* | 10/2005 | Shiiba | B60W 10/06 701/70 |
| 2006/0095171 | A1* | 5/2006 | Whittaker | G05D 1/027 701/25 |
| 2006/0235753 | A1* | 10/2006 | Kameyama | B60H 1/00742 705/15 |
| 2008/0097699 | A1* | 4/2008 | Ono | B60R 21/0134 701/300 |
| 2010/0299109 | A1* | 11/2010 | Saito | B60W 40/072 703/1 |
| 2011/0016996 | A1* | 1/2011 | Suda | B61C 17/06 74/5.1 |
| 2013/0013154 | A1* | 1/2013 | Aoki | B62D 5/046 701/42 |
| 2016/0001781 | A1* | 1/2016 | Fung | B60W 40/08 701/36 |
| 2016/0078766 | A1* | 3/2016 | Kiyokawa | B62D 15/0285 340/932.2 |
| 2016/0114794 | A1* | 4/2016 | Sakaguchi | B60W 30/18109 701/72 |
| 2016/0216128 | A1* | 7/2016 | Takano | B60R 1/00 |
| 2016/0265922 | A1* | 9/2016 | Thakur | G05D 1/0212 |
| 2016/0265930 | A1* | 9/2016 | Thakur | G05D 1/0088 |
| 2017/0008521 | A1* | 1/2017 | Braunstein | G01C 21/32 |

FOREIGN PATENT DOCUMENTS

| | | |
|---|---|---|
| JP | 2004-338636 | 12/2004 |
| JP | 2004-338638 | 12/2004 |
| JP | 4092054 | 3/2008 |
| JP | 2009-208742 | 9/2009 |
| JP | 2011-046335 | 3/2011 |
| JP | 2014-034230 | 2/2014 |
| JP | 2015-214223 | 12/2015 |

* cited by examiner

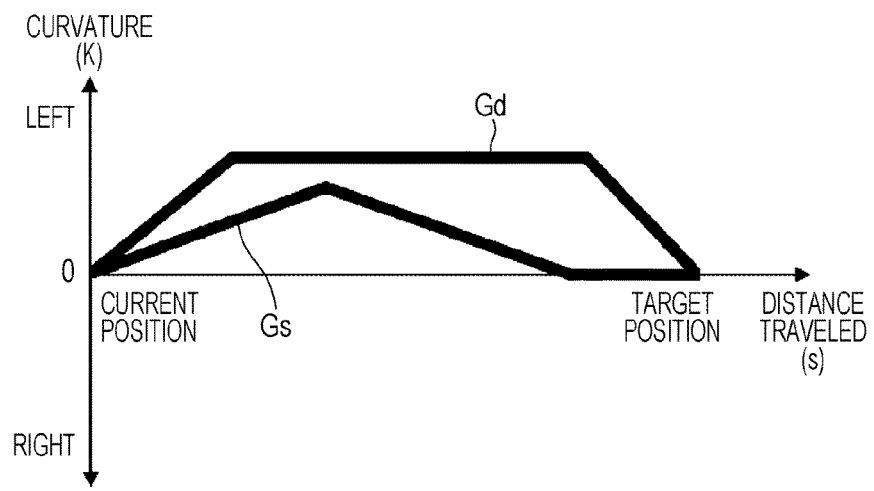
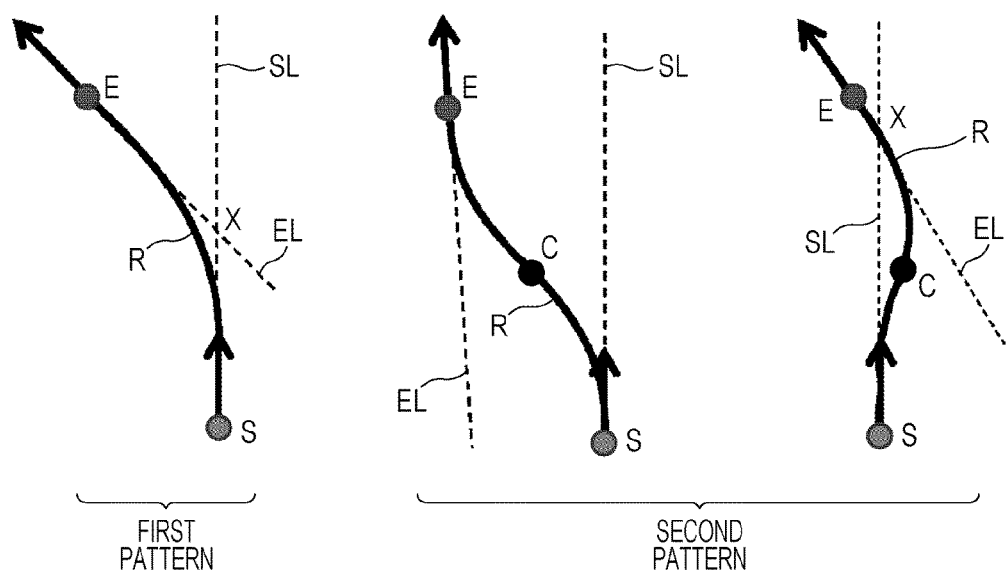

MOVEMENT ROUTE GENERATING APPARATUS AND MOVEMENT ROUTE GENERATING METHOD

RELATED APPLICATION

The present application claims priority to Japanese Patent Application Number 2016-135109, filed Jul. 7, 2016, the entirety of which is hereby incorporated by reference.

BACKGROUND

1. Field of the Invention

The present invention relates to a movement route generating apparatus and a movement route generating method, and is preferably used particularly for an apparatus and method for generating a movement route along which a vehicle is to be guided to a target position by automatic driving.

2. Description of the Related Art

Conventional systems known in the related art automatically control the steering of a vehicle so that the vehicle travels on a predetermined movement route and stops at a target position such as a parking lot (see Japanese Unexamined Patent Application Publication Nos. 9-50596, 2014-34230, 2011-46335, 2004-338636, 2009-208742, 2004-291866, 2004-338638 and 2015-214223, and Japanese Patent No. 4092054, for example).

Japanese Unexamined Patent Application Publication No. 9-50596 discloses a technique that enables an agreeable guidance without rapid steering. Specifically, in Japanese Unexamined Patent Application Publication No. 9-50596, it is described that a smooth guidance trajectory with no abrupt curvature changes is made by calculating a guiding trajectory using a curve (clothoid curve), the curvature of which changes continuously, according to a slant distance from the current position of the vehicle to a target position of the vehicle, the position of an intersection formed by the axial line of the vehicle at the current position and the axial line of the vehicle at the target position, and an attitude angle formed by the axial line of the vehicle at the current position in the direction of travel and the axial line of the vehicle at the target position in the direction of travel.

Japanese Unexamined Patent Application Publication No. 2014-34230 discloses a technique that enables a target route to be easily generated even in a narrow parking lot. Specifically, if an attitude angle $\theta$, which is formed by a direction of travel of the vehicle at a target position with a direction of travel of the vehicle at an initial position, and a stroke angle $\phi$, which is formed by a line segment linking the initial position and the target position together with a direction of travel of the vehicle at the initial position, have a relationship in that $\theta$ is larger than or equal to $2\phi$, a target route is generated by combining a curve (clothoid curve) that varies in curvature with a curve (arc) that has a constant curvature. By contrast, if $\theta$ is smaller than $2\phi$, a target route is generated with respect to a first circumference C1 that passes through the initial position and is a tangent to the direction of travel of the vehicle at the initial position and a second circumference C2 that passes through the target position and is a tangent to the first circumference C1 and the line in the direction of travel of the vehicle at the target position.

In Japanese Unexamined Patent Application Publication No. 2011-46335, it is described that a parking route from a current position of a vehicle to a parking frame is generated by combining at least one of an arc, a clothoid curve, and a straight line.

In Japanese Unexamined Patent Application Publication No. 2004-338636 as well, it is described that a travel trajectory is set by combining at least one of an arc, a clothoid curve, and a straight line. In Japanese Unexamined Patent Application Publication No. 2004-338636, it is also described that if a vehicle position deviates from an initial travel trajectory, the method of calculating a new route to be set is changed depending on the amount of deviation. Specifically, if the amount of deviation is small, a route that returns to the previous route is calculated; and if the amount of deviation is large, a route that guides to the target position without considering the previous route is calculated again.

In Japanese Unexamined Patent Application Publication No. 2009-208742, it is described that if the center of a vehicle deviates from the center line of a guidance route, a route that returns to the guidance route is generated according to the movement speed of the vehicle and the steering angle of the vehicle at a reference position. In Japanese Unexamined Patent Application Publication No. 2009-208742, it is also described that even if the steering wheel of the vehicle at the current position is rotated up to a stroke end, but the vehicle will not be guided to the target parking position, it is decided that a guidance route cannot be set and parking support is terminated.

In Japanese Unexamined Patent Application Publication No. 2004-291866, it is described that if the amount of deviation of the current position from the initially set route has reached a predetermined value, a route to the target parking position is calculated again according to the steering angle and a relative positional relation, between the current position and the target parking position, at the time of calculation of the route.

In Japanese Unexamined Patent Application Publication No. 2004-338638, it is described that the amount of control delay during steering is estimated or detected and a travel route is set by setting the amount of change in turning curvature with respect to the distance traveled in consideration of the estimated or detected amount of control delay.

In Japanese Unexamined Patent Application Publication No. 2015-214223, it is described that data on a backing start position at which the vehicle starts to move backward to a parking area and a final stop position in the parking area are stored in correspondence to the parking area data that has been set in advance; the travel trajectory of the vehicle that moves backward from the backing start position to the final vehicle stop position and also turns during moving backward is corrected by using data on the relative positions of a detected obstacle and the vehicle, and calculates a corrected travel trajectory along which the vehicle moving backward does not encounter the obstacle.

In Japanese Patent No. 4092054, it is described that precise automatic parking is achieved by preventing deviation of the current position of a vehicle from a movement trajectory with the minimum time required for automatic parking.

SUMMARY

In manual driving, in which a driver operates the steering wheel by oneself, the vehicle moves as intended by the driver, so the driver does not feel uncomfortable when the vehicle moves along the travel trajectory, nor does the driver undergo an unexpected force due to an unintended rapid trajectory variation. In automatic driving, in which the steering wheel of the vehicle is automatically controlled, however, the vehicle moves regardless of the intention of the driver. If steering control attended by a rapid angular change is performed, therefore, occupants may undergo discomfort.

In view of this, an object of the present disclosure is to set a movement route, which causes occupants to experience comfort by reducing force to be applied to the occupants.

To achieve the above object, in one embodiment of the present invention, a graph is generated that has most gentle inclinations, each inclination indicating the degree of change in curvature per unit distance traveled, by plotting the curvature of a travel trajectory matching the steering angle of the vehicle and the distance traveled by the vehicle on two axes, under the conditions that the area of a graph generated in correspondence to a travel trajectory from the current position to a target position is equal to an angle formed by the direction in which the vehicle at the target position travels with the direction in which the vehicle at the current position travels and the maximum curvature of a travel trajectory due to the maximum steering angle that the vehicle can control is an upper limit, after which a travel trajectory represented by the generated graph is generated as a movement route of the vehicle.

According to the embodiment configured as described above, a travel trajectory is calculated such that the degree of change in curvature per unit distance traveled is smallest. "The degree of change in curvature of a travel trajectory is small" means that the horizontal angular velocity caused by a steering operation of the vehicle is low. Therefore, when this type of travel trajectory is calculated and set as a movement route, the setting of the movement route may cause occupants to experience comfort by reducing force to be applied to the occupants.

BRIEF DESCRIPTION OF THE DRAWINGS

FIG. 3 illustrates movement routes generated by the movement route generating apparatus in the embodiment;

FIGS. 4A to 4C schematically illustrate processing by a pattern determining unit and a pass-through point setting unit;

DETAILED DESCRIPTION OF THE PREFERRED EMBODIMENTS

Figure 1:
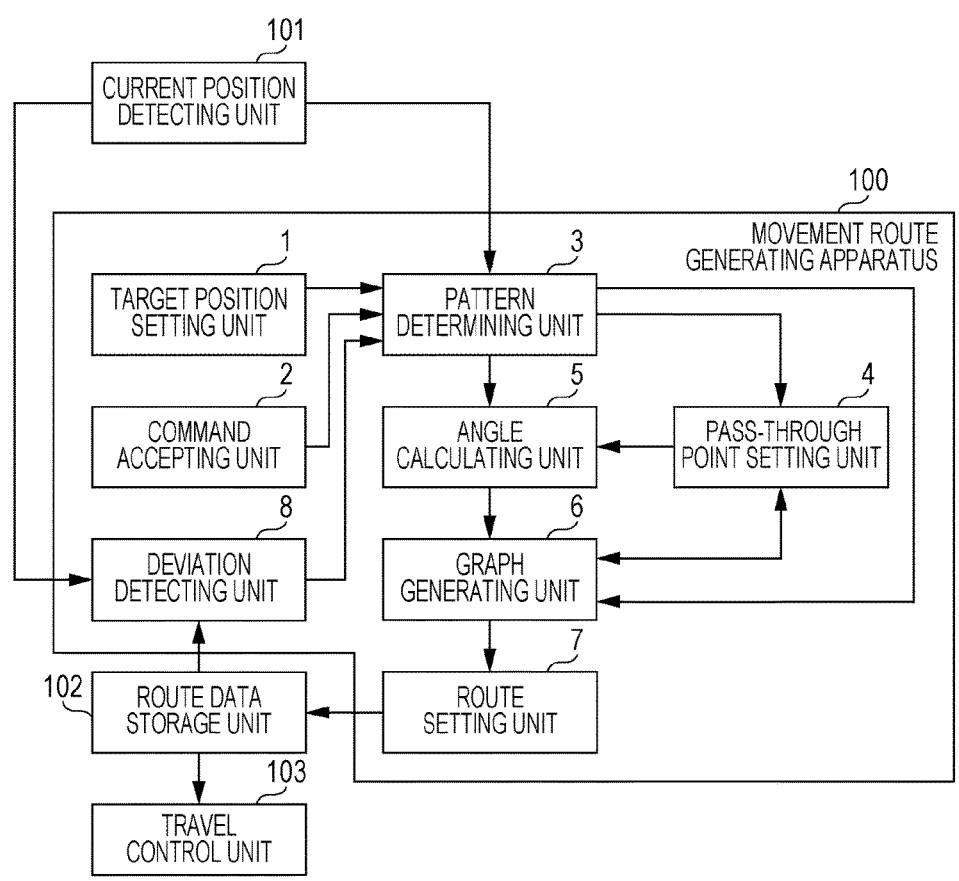
FIG. 1 is a block diagram illustrating an example of the functional configuration of a movement route generating apparatus in an embodiment.

An embodiment of the present invention will be described with reference to the drawings. FIG. 1 is a block diagram illustrating an example of the functional configuration of a movement route generating apparatus in this embodiment. As illustrated in FIG. 1, the movement route generating apparatus 100 in this embodiment includes, as the functional configuration, a target position setting unit 1, a command accepting unit 2, a pattern determining unit 3, a pass-through point setting unit 4, an angle calculating unit 5, a graph generating unit 6, a route setting unit 7, and a deviation detecting unit 8. A configuration related to the movement route generating apparatus 100 includes a current position detecting unit 101, a route data storage unit 102, and a travel control unit 103.

Functional blocks 1 to 8 included in the movement route generating apparatus 100 can be implemented by any of hardware, a digital signal processor (DSP), and software. If, for example, the functional blocks 1 to 8 are implemented by software, they are configured by including a central processing unit (CPU), a random-access memory (RAM), a read-only memory (ROM) and other components in a computer in practice. The functional blocks are implemented when programs stored in a recording medium such as the RAM, the ROM, a hard disk, or a semiconductor memory are operated.

The movement route generating apparatus 100, configured as illustrated in FIG. 1 in this embodiment, generates a movement route along which a vehicle is to be moved by automatic driving from the current position to a target position. Particularly, the movement route generating apparatus 100 in this embodiment can generate a movement route along which the vehicle can move while causing occupants to experience comfort by reducing force to be applied to the occupants, that is, a movement route along which the vehicle can move while keeping a horizontal angular velocity caused by a steering operation as low as possible.

The movement route on which a horizontal angular velocity is reduced as much as possible can be defined as a movement route that reduces the inclinations of a graph generated to represent a travel trajectory from the current position to the target position as much as possible, the graph being generated by plotting the curvature of a travel trajectory matching the steering angle of the vehicle on the vertical axis and plotting the distance that the vehicle has traveled on the horizontal axis, as illustrated in FIG. 3. This type of travel route becomes either a travel route represented like a graph Gs in an isosceles triangular shape or graph Gd in a bilaterally symmetric trapezoidal shape, which will be described later in detail.

The constituent components in FIG. 1 will be described below. The current position detecting unit 101 detects the current position of the vehicle. The current position detecting unit 101 includes an autonomous navigation sensor, a Global Positioning System (GPS) receiver, a position calculating CPU, and the like. The autonomous navigation sensor includes a vehicle velocity sensor (distance sensor) that outputs one pulse each time a vehicle travels a predetermined distance and that determines a distance the vehicle has moved, and an angular velocity sensor (relative direction sensor), such as a vibration gyroscope, that detects the yaw angle (movement direction) of the vehicle. The autonomous navigation sensor detects the relative position and direction of the vehicle by using the vehicle velocity sensor and angular velocity sensor.

The position calculating CPU calculates an absolute position (estimated vehicle position) and a direction of the vehicle in accordance with data of the relative position and a direction of the vehicle, the data being output from the autonomous navigation sensor. The GPS receiver receives radio waves transmitted from a plurality of GPS satellites with a GPS antenna and performs three-dimensional positioning processing or two-dimensional positioning processing to calculate the absolute position and direction of the vehicle (the direction of the vehicle is calculated according to the position of the vehicle at the current time and the position of the vehicle of at a time one sampling time $\Delta T$ before).

The target position setting unit 1 sets a target position to which to move the vehicle by automatic driving. The target position setting unit 1 also sets a target direction in which to move the vehicle at the target position. If, for example, the user operates an operation unit such as a touch panel to specify a parking frame in a parking lot, the target position setting unit 1 sets the central point of the parking lot as the target position and also sets the longitudinal direction of the parking frame as the target direction. The target position and target direction indicated here are just examples, and these are not limitations.

The command accepting unit 2 accepts an operation that commands the setting of a movement route. If, for example, the target position setting unit 1 sets a target position and then a route setting button or the like is operated, the command accepting unit 2 accepts the operation. The operation of an enter button that enters the target position set by the target position setting unit 1 may be accepted as an operation to command the setting of a movement route. Alternatively, an operation to shift to the reverse gear after a target position has been set by the target position setting unit 1 may be accepted as an operation to command the setting of a movement route.

When the command accepting unit 2 accepts the operation to command the setting of a movement route, the movement route generating apparatus 100 executes processing to generate a movement route as described below. Specifically, when the command accepting unit 2 accepts the operation to command the setting of a movement route, processing by the pattern determining unit 3, pass-through point setting unit 4, angle calculating unit 5, graph generating unit 6, and route setting unit 7 is executed.

The pattern determining unit 3 determines which pattern is used to generate a movement route, a first pattern to move the vehicle from the current position to the target position by steering in one direction or a second pattern to move the vehicle from the current position to the target position by steering in two directions, depending on the positional relationship between the current position and the target position. Specifically, the pattern determining unit 3 determines to use the first pattern or second pattern depending on whether the intersection of the axial line (straight line representing the direction of the vehicle) of the vehicle at the current position and the axial line (straight line representing the target direction) of the vehicle at the target position is present between the current position and the target position and whether the distance between the intersection and the target position is shorter than or equal to a predetermined value.

If the pattern determining unit 3 determines that the second pattern is to be used, the pass-through point setting unit 4 sets a pass-through point between the current position and the target position. A position at which to set a pass-through point between the current position and the target position is determined by trial and error through a simulation described later. This simulation includes processing to search for a pass-through point resulting in an optimum movement route that reduces the horizontal angular velocity exerted on the vehicle as much as possible.

FIGS. 4A to 4C schematically illustrate processing by the pattern determining unit 3 and pass-through point setting unit 4. FIG. 4A illustrates an example in which the first pattern is to be used due to the positional relationship between the current position and the target position. FIGS. 4B and 4C illustrate examples in which the second pattern is to be used due to the positional relationship between the current position and the target position.

FIG. 4A illustrates a case in which the intersection X of the axial line SL of the vehicle at the current position S and the axial line EL of the vehicle at the target position E is present between the current position S and the target position E and the distance between the intersection X and the target position E is longer than a predetermined value. In this case, the pattern determining unit 3 determines that the first pattern is to be used. In response to this decision, the pass-through point setting unit 4 does not set a pass-through point. Instead, the route setting unit 7 generates a movement route R along which the vehicle moves from the current position S to the target position E while being steered slowly in one direction, as will be described later.

FIG. 4B illustrates a case in which the intersection of the axial line SL of the vehicle at the current position S and the axial line EL of the vehicle at the target position E is not present between the current position S and the target position E. In this case, the pattern determining unit 3 determines that the second pattern is to be used. In response to this decision, the pass-through point setting unit 4 sets a pass-through point C between the current position S and the target position E and between the two axial lines SL and EL. Then, the route setting unit 7 generates a movement route R along which the vehicle moves from the current position S to the pass-through point C while being steered slowly in one direction, and further moves from the pass-through point C to the target position E while being steered slowly in the opposite direction, as will be described later.

FIG. 4C illustrates a case in which the intersection X of the axial line SL of the vehicle at the current position S and the axial line EL of the vehicle at the target position E is present between the current position S and the target position E and the distance between the intersection X and the target position E is shorter than or equal to the predetermined value. In this case, although the intersection X is present, the distance from the intersection X to the target position E is too short for the vehicle to turn by steering only in one direction. Therefore, the pass-through point setting unit 4 sets a pass-through point C between the current position S and the target position E and outside the axial line SL at the current position S. Then, the route setting unit 7 generates a movement route R along which the vehicle moves from the current position S to the pass-through point C while being steered slowly in one direction, and further moves from the pass-through point C to the target position E while being steered slowly in the opposite direction, as will be described later.

The distance between the intersection X and the target position E, which is considered in the determination of a pattern, may be a slant distance between the intersection X and the target position E or may be a horizontal distance between the intersection X and the target position E. The horizontal distance refers to, for example, a distance between the axial line SL and a virtual line that passes through the target position E and is parallel to the axial line SL.

The angle calculating unit 5 calculates an angle (denoted θ below) formed by comparing the direction in which the vehicle at the target position travels with the direction in which the vehicle at the current position travels. The angle θ calculated by the angle calculating unit 5 is equal to the area (denoted P below) of the graph illustrated in FIG. 3. Specifically, for the graph Gs, the area of the isosceles triangle is equal to the angle θ formed by the direction in which the vehicle at the target position travels with the direction in which the vehicle at the current position travels. Similarly, for the graph Gd, the area of the trapezoid is equal to the angle θ. The principle of this will be described below.

Figure 5:
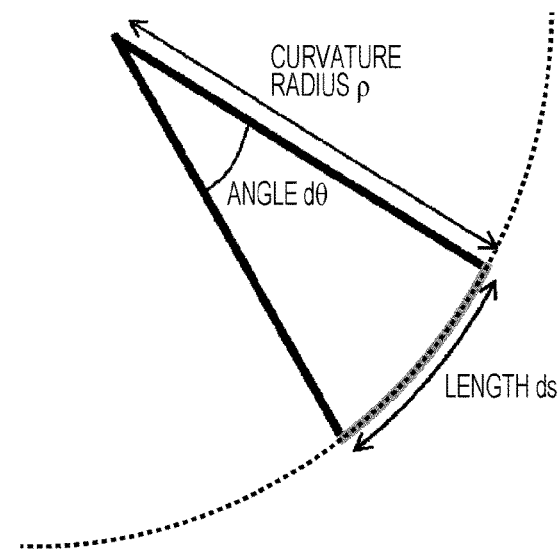
FIG. 5 illustrates a principle in which an area formed by an angular difference between the current position and a target position becomes equal to the area under a curve in a graph.

The travel trajectory (assumed to be a curve with a total length of s) from the current position to the target position is divided into many arcs L1, L2, ..., LN, each of which is very short. The lengths of these arcs (arc lengths) are denoted ds1, ds2, ..., dsN, and the central angles of the arcs (radians) are denoted dθ1, dθ2, ..., dθN. The sum of ds1, ds2, ..., dsN is s. FIG. 5 illustrates one arc. The length of this arc is ds, its central angle is dθ, and its radius of curvature is ρ. Focusing on part of a curve, when its local curve is approximated to a circle, the radius of the circle is referred to as the radius of curvature, and the reciprocal of the radius of curvature is referred to as curvature.

In this case, the following is obtained from an ordinary formula about an arc.

$$\rho = ds/d\theta \quad (1)$$

Therefore, curvature K, which is the reciprocal of the radius of curvature ρ is represented as follows.

$$K = d\theta/ds \quad (2)$$

The above equation is rewritten as follows.

$$d\theta = K \times ds \quad (3)$$

Locally, therefore, the product of the curvature K and the arc length ds becomes equal to the angle dθ formed by the comparing direction in which the vehicle at the position after the movement travels with the direction in which the vehicle at the position before the movement travels.

If the definite integral of the left side of equation (3) above is taken with respect to the length s, the total amount of change in the angle dθ, that is, θ, is obtained. By contrast, the definite integral of the right side of equation (3) above is taken with respect to the length s, the area P of a graph illustrated in FIG. 3 is obtained. The angle θ and the area P described here are both in radians. Therefore, it can be said that equality is found between the angle θ in radians formed by comparing the direction in which the vehicle at the target position travels with the direction in which the vehicle at the current position travels and the area P, in radians, of a graph illustrated in FIG. 3.

The graph generating unit 6 generates a graph that has the most gentle inclinations, each inclination indicating the degree of change in curvature per unit distance traveled, by plotting the curvature K of a travel trajectory matching the steering angle of the vehicle and a distance s traveled by the vehicle on two axes, under two conditions described below.

1) The area P of a graph generated in correspondence to a travel trajectory from the current position to the target position is equal to the angle θ calculated by the angle calculating unit 5.

2) The maximum curvature of a travel trajectory due to the maximum steering angle that the vehicle can control is an upper limit.

Figure 6A:
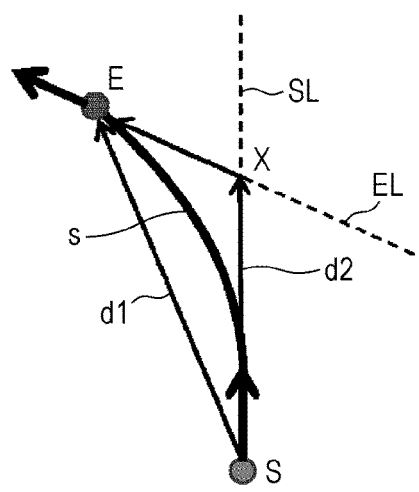
FIGS. 6A and 6B each illustrate the shortest distance and the longest distance in a range of a distance traveled along a movement route generated by the graph generating unit in the embodiment.

By taking, as the minimum distance, a slant distance d1 from the current position S to the target position E and also taking, as the maximum distance, a distance d2 over which the vehicle moves so as to draw a polygonal line from the current position S through the intersection X, which is formed by a front half line along the axial line SL of the vehicle at the current position S and a back half line along the axial line EL of the vehicle at the target position E, to the target position E, as illustrated in FIG. 6A, the graph generating unit 6 also generates a graph so that the distance s traveled from the current position S to the target position E falls into a range from the minimum distance d1 to the maximum distance d2. This graph generation processing will be specifically described later with reference to FIG. 2.

The route setting unit 7 sets, as the movement route of the vehicle, a travel trajectory represented by the graph generated by the graph generating unit 6. Data of the movement route set by the route setting unit 7 is stored in the route data storage unit 102. The data of the movement route is composed of, for example, data indicating curvature at intervals of a predetermined distance starting from the current position and data of a travel trajectory represented by the curvature data.

The travel control unit 103 controls the steering angle in steering at intervals of a predetermined distance according to the movement route data stored in the route data storage unit 102 to control the travel of the vehicle. The curvature stored as movement route data in the route data storage unit 102 indicates the reciprocal of the turning radius of the vehicle, so the steering angle can be derived from the reciprocal.

After the movement route has been set, the deviation detecting unit 8 detects a deviation of the position of the vehicle from the movement route during travel control by the travel control unit 103 according to the current position, detected by the current position detecting unit 101, of the vehicle and the movement route data stored in the route data storage unit 102. When the deviation detecting unit 8 detects a deviation from the movement route, the movement route generating apparatus 100 executes processing to generate a movement route again. Specifically, when a deviation is detected by the deviation detecting unit 8, the movement route generating apparatus 100 executes processing of the pattern determining unit 3, pass-through point setting unit 4, angle calculating unit 5, graph generating unit 6, and route setting unit 7 again.

If the pattern determining unit 3 determines that the second pattern is to be used, the angle calculating unit 5 further calculates a first angle θ1, which is formed by comparing the direction in which the vehicle at the pass-through point C travels with the direction in which the vehicle at the current position S travels, and a second angle θ2, which is formed by comparing the direction in which the vehicle at the target position E travels with the direction in which the vehicle at the pass-through point C travels. The direction in which the vehicle at the pass-through point C travels is virtually set.

If the pattern determining unit 3 determines that the second pattern is to be used, the graph generating unit 6 generates a first graph corresponding to the movement route from the current position S to the pass-through point C and a second graph corresponding to the movement route from the pass-through point C to the target position E under conditions 1) to 3) described below. In this case, the graph generating unit 6 generates the first graph and second graph so that their inclinations become the most gentle.

1) The area P1 of the first graph generated in correspondence to a travel trajectory formed by steering in one direction from the current position S to the pass-through point C is equal to the first angle θ1 calculated by the angle calculating unit 5.

2) The area P2 of the second graph generated in correspondence to a travel trajectory formed by steering in the opposite direction from the pass-through point C to the target position E is equal to the second angle θ2 calculated by the angle calculating unit 5.

3) The maximum curvature of a travel trajectory due to the maximum steering angle that the vehicle can control is an upper limit.

Figure 6B:
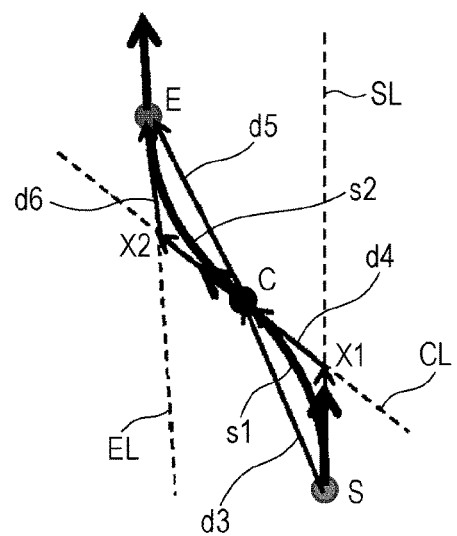

At this time, by taking, as the minimum distance, a slant distance d3 from the current position S to the pass-through point C and also taking, as the maximum distance, a distance d4 over which the vehicle moves so as to draw a polygonal line from the current position S through an intersection X1, which is formed by a front half line along the axial line SL of the vehicle at the current position S and a back half line along the axial line CL of the vehicle at the pass-through point C, to the pass-through point C, as illustrated in FIG. 6B, the graph generating unit 6 generates the first graph so that a distance s1 traveled from the current position S to the pass-through point C falls into a range from the minimum distance d3 to the maximum distance d4.

In addition, by taking, as the minimum distance, a slant distance d5 from the pass-through point C to the target position E and also taking, as the maximum distance, a distance d6 over which the vehicle moves so as to draw a polygonal line from the pass-through point C through an intersection X2, which is formed by a front half line along the axial line CL of the vehicle at the pass-through point C and a back half line along the axial line EL of the vehicle at the target position E, to the target position E, the graph generating unit 6 generates the second graph so that a distance s2 traveled from the pass-through point C to the target position E falls into a range from the minimum distance d5 to the maximum distance d6.

If the pattern determining unit 3 determines that the second pattern is to be used, the route setting unit 7 sets the travel trajectories represented by the first graph and second graph generated by the graph generating unit 6 as the movement routes of the vehicle.

Figure 2:
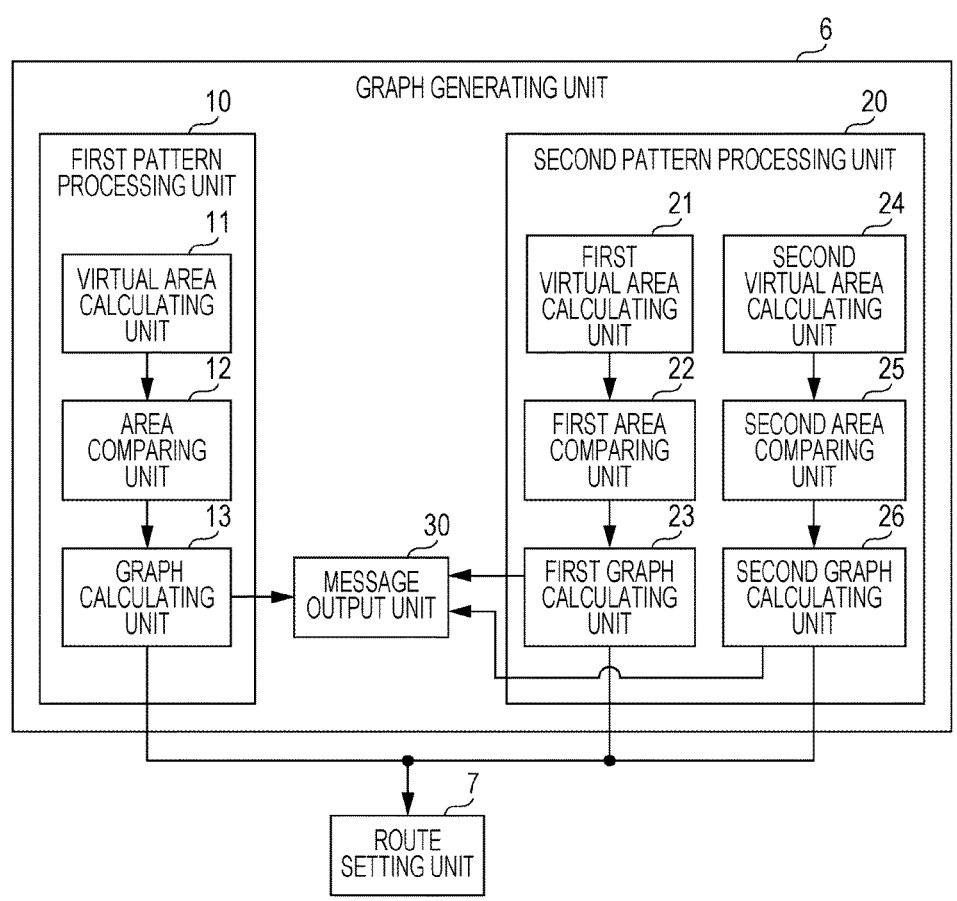
FIG. 2 is a block diagram illustrating a specific example of the functional configuration of a graph generating unit in the embodiment.

FIG. 2 is a block diagram illustrating a specific example of the functional configuration of the graph generating unit 6 in this embodiment. As illustrated in FIG. 2, the graph generating unit 6 in this embodiment includes, as the functional configuration, a first pattern processing unit 10, a second pattern processing unit 20, and a message output unit 30. The first pattern processing unit 10 includes a virtual area calculating unit 11, an area comparing unit 12, and a graph calculating unit 13. The second pattern processing unit 20 includes a first virtual area calculating unit 21, a first area comparing unit 22, a first graph calculating unit 23, a second virtual area calculating unit 24, a second area comparing unit 25, and a second graph calculating unit 26.

Figure 7:
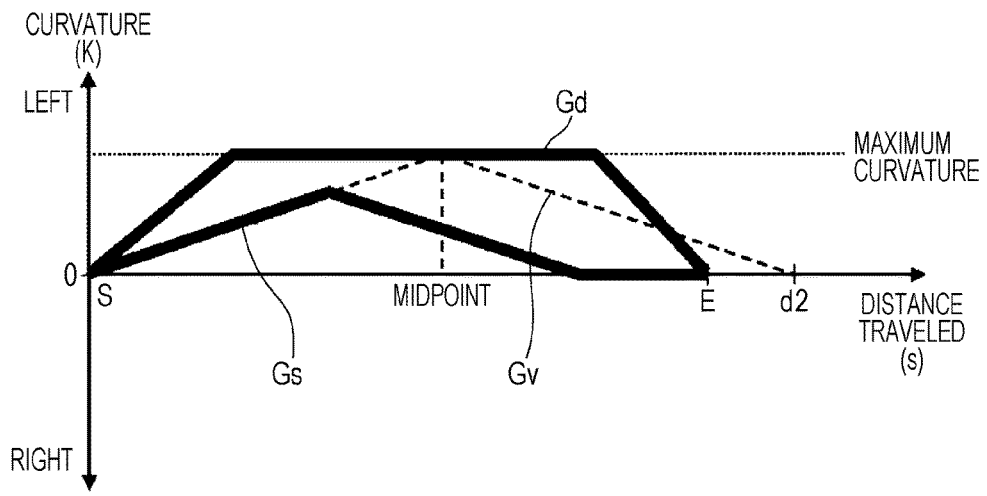
FIG. 7 illustrates a graph generated by a first pattern processing unit in the embodiment.

If the pattern determining unit 3 determines that the first pattern is to be used, processing by the first pattern processing unit 10 is executed. The virtual area calculating unit 11 assumes a virtual graph Gv in an isosceles triangular shape in which a midpoint is virtually set, on the axis of the distance traveled, between the current position S and the end point of the maximum distance d2 in a two-dimensional space illustrated in FIG. 7, and the curvature K is linearly raised up to the maximum curvature in the range from the current position S to the midpoint, after which the curvature K is linearly lowered down to zero in the range from the midpoint to the end of the maximum distance d2. The virtual area calculating unit 11 then calculates a virtual area Pv, which is the area of the virtual graph Gv.

The area comparing unit 12 makes a comparison in size between the virtual area Pv calculated by the virtual area calculating unit 11 and the actual area P equal to the angle θ calculated by the angle calculating unit 5. The graph calculating unit 13 calculates a graph in an isosceles triangular shape or trapezoidal shape across the current position S and the target position E, depending on the result of the comparison by the area comparing unit 12.

That is, if the area comparing unit 12 determines that the virtual area Pv is larger than the actual area P, the graph calculating unit 13 calculates the graph Gs, which is analogous to the triangle represented by the virtual graph Gv and has the same area as the actual area P. Specifically, the graph calculating unit 13 calculates the graph Gs by gradually lowering the vertex of the isosceles triangle of the virtual graph Gv along the straight line (leg on the left side of the isosceles triangle) from the current position S of the virtual graph Gv to its midpoint until the isosceles triangle has the same area as the actual area P.

In this case, the route setting unit 7 sets a movement route that has a travel trajectory formed by linking a clothoid curve along which the trajectory is curved so that the curvature is gradually increased along the leg on the left side of the isosceles triangle, a clothoid curve along which the trajectory is curved so that the curvature is gradually reduced down to zero along the leg on the right side, and a straight that extends to the target position E while the curvature is maintained at zero.

If the area comparing unit 12 determines that the virtual area Pv is smaller than the actual area P, the graph calculating unit 13 calculates the graph Gd, which is formed in a trapezoidal shape having a distance segment that extends while the maximum curvature is maintained and having the same area as the actual area P. Specifically, the graph calculating unit 13 calculates the graph Gd, which is formed in a bilaterally symmetric trapezoidal shape that has a line segment from the current position S to the target position E on the axis of the distance traveled as the lower base and also has a predetermined length of line segment set on the line having the maximum curvature as the upper base, and which has the same area as the actual area P.

In this case, the route setting unit 7 sets a movement route that has a travel trajectory formed by linking a clothoid curve along which the trajectory is curved so that the curvature is gradually increased along the leg on the left side of the trapezoid, an arc along which the trajectory is curved while the maximum curvature is maintained, and a clothoid curve along which the trajectory is curved so that the curvature is gradually reduced down to zero along the leg on the right side.

If even the trapezoidal graph calculated by the graph calculating unit 13 cannot have the same area as the actual area P, the message output unit 30 outputs an error message. Specifically, even if the inclination of the leg of the trapezoid is increased to 90 degrees to reshape the graph to a rectangle, if the area of the rectangle is still smaller than the actual area P, a movement route cannot be generated, so an error message is output.

If the pattern determining unit 3 determines that the second pattern is to be used, processing by the second pattern processing unit 20 is executed. Processing by the second pattern processing unit 20 is similar to processing by the first pattern processing unit 10 in the range from the current position S to the pass-through point C and in the range from the pass-through point C to the target position E.

Figure 8:
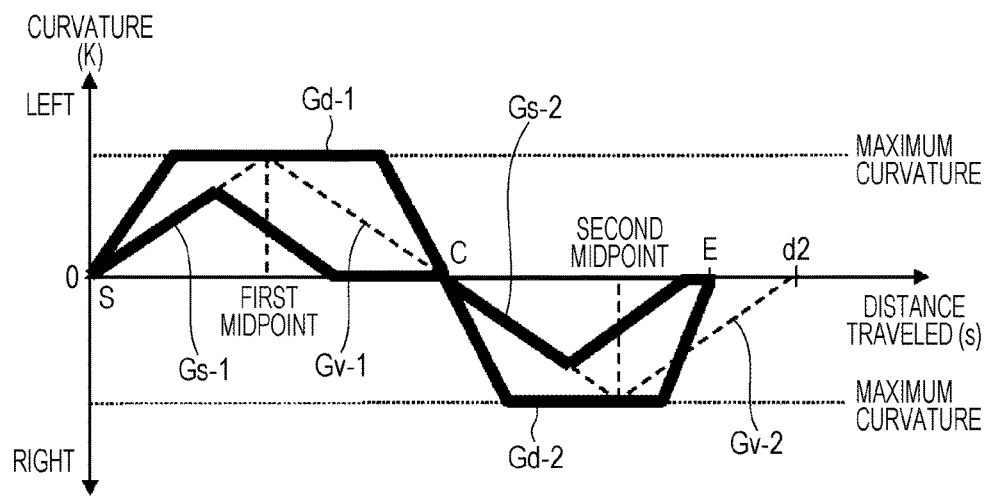
FIG. 8 illustrates a graph generated by a second pattern processing unit in the embodiment.

The first virtual area calculating unit 21 assumes a virtual graph Gv-1 in an isosceles triangular shape in which a first midpoint virtually is set between the current position S and the pass-through point C on the axis of the distance traveled in a two-dimensional space illustrated in FIG. 8, and the curvature K is linearly raised up to the maximum curvature in the range from the current position S to the first midpoint, after which the curvature K is linearly lowered down to zero in the range from the first midpoint to the pass-through point C. The first virtual area calculating unit 21 then calculates a first virtual area Pv-1, which is the area of the first virtual graph Gv-1.

The first area comparing unit 22 makes a comparison in size between the first virtual area Pv-1 calculated by the first virtual area calculating unit 21 and a first actual area P1 equal to the first angle θ1 calculated by the angle calculating unit 5. The first graph calculating unit 23 calculates a first graph in an isosceles triangular shape or trapezoidal shape across the current position S and the pass-through point C, depending on the result of the comparison by the first area comparing unit 22.

That is, if the first area comparing unit 22 determines that the first virtual area Pv-1 is larger than the first actual area P1, the first graph calculating unit 23 calculates a first graph Gs-1, which is analogous to the triangle represented by the first virtual graph Gv-1 and has the same area as the first actual area P1.

In this case, the route setting unit 7 sets a movement route having a travel trajectory formed by linking a clothoid curve along which the trajectory is curved so that the curvature is gradually increased along the leg on the left side of the isosceles triangle, a clothoid curve along which the trajectory is curved so that the curvature is gradually reduced down to zero along the leg on the right side, and a straight segment that extends to the pass-through point C while the curvature is maintained at zero.

If the first area comparing unit 22 determines that the first virtual area Pv-1 is smaller than the first actual area P1, the first graph calculating unit 23 calculates a first graph Gd-1, which is formed in a trapezoidal shape having a distance segment that extends while the maximum curvature is maintained, and which has the same area as the first actual area P1.

In this case, the route setting unit 7 sets a movement route having a travel trajectory formed by linking a clothoid curve along which the trajectory is curved so that the curvature is gradually increased along the leg on the left side of the trapezoid, an arc along which the trajectory is curved while the maximum curvature is maintained, and a clothoid curve along which the trajectory is curved so that the curvature is gradually reduced down to zero along the leg on the right side.

The second virtual area calculating unit 24 assumes a second virtual graph Gv-2 in an isosceles triangular shape in which a midpoint is virtually set on the axis of the distance traveled between the pass-through point C and the end point of the maximum distance d2 in a two-dimensional space illustrated in FIG. 8, and the curvature K is linearly raised up to the maximum curvature in the range from the pass-through point C to the second midpoint, after which the curvature K is linearly lowered down to zero in the range from the second midpoint to the end of the maximum distance d2. The second virtual area calculating unit 24 then calculates a second virtual area Pv-2, which is the area of the second virtual graph Gv-2.

The second area comparing unit 25 makes a comparison in size between the second virtual area Pv-2 calculated by the second virtual area calculating unit 24 and a second actual area P2 equal to the second angle θ2 calculated by the angle calculating unit 5. The second graph calculating unit 26 calculates a second graph in an isosceles triangular shape or trapezoidal shape across the pass-through point C and the target position E, depending on the result of the comparison by the second area comparing unit 25.

That is, if the second area comparing unit 25 determines that the second virtual area Pv-2 is larger than the second actual area P2, the second graph calculating unit 26 calculates a second graph Gs-2, which is analogous to the triangle represented by the second virtual graph Gv-2 and has the same area as the second actual area P2.

In this case, the route setting unit 7 sets a movement route having a travel trajectory formed by linking a clothoid curve along which the trajectory is curved so that the curvature is gradually increased along the leg on the left side of the isosceles triangle, a clothoid curve along which the trajectory is curved so that the curvature is gradually reduced down to zero along the leg on the right side, and a straight segment that extends to the target position E while the curvature is maintained at zero.

If the second area comparing unit 25 determines that the second virtual area Pv-2 is smaller than the second actual area P2, the second graph calculating unit 26 calculates a second graph Gd-2, which is formed in a trapezoidal shape having a distance segment that extends while the maximum curvature is maintained, and which has the same area as the second actual area P2.

In this case, the route setting unit 7 sets a movement route having a travel trajectory formed by linking a clothoid curve along which the trajectory is curved so that the curvature is gradually increased along the leg on the left side of the trapezoid, an arc along which the trajectory is curved while the maximum curvature is maintained, and a clothoid curve along which the trajectory is curved so that the curvature is gradually reduced down to zero along the leg on the right side.

A graph that can be drawn in the two-dimensional space in FIG. 8 varies depending on the position at which the pass-through point C is set. In view of this, processing by the second pattern processing unit 20 is repeated with different positions at which the route setting unit 7 sets the pass-through point C. The position at which the inclinations of the graph are minimized is used. It is most preferable to generate both the first graph and the second graph in a triangular shape. If at least one of the first graph and second graph is unavoidably generated in a trapezoidal shape, it is preferable to generate a graph so that the inclinations of the trapezoid are reduced as much as possible.

There are an infinite number of positions at which the pass-through point C can be set between the current position S and the target position E. It is possible to set all of an infinite number of pass-through points C in succession, calculate the first graph and second graph for each pass-through point C, and find the graph with the smallest inclination. By contrast, to reduce a computation load, the number of pass-through points C to be set may be determined in advance and the graph with the smallest inclination among the graphs calculated for these pass-through points C may be found.

If even the trapezoidal graph generated by the first graph calculating unit 23 cannot have the same area as the actual area P1, or even the trapezoidal graph generated by the second graph calculating unit 26 cannot have the same area as the actual area P2, the message output unit 30 outputs an error message.

Figure 9A:
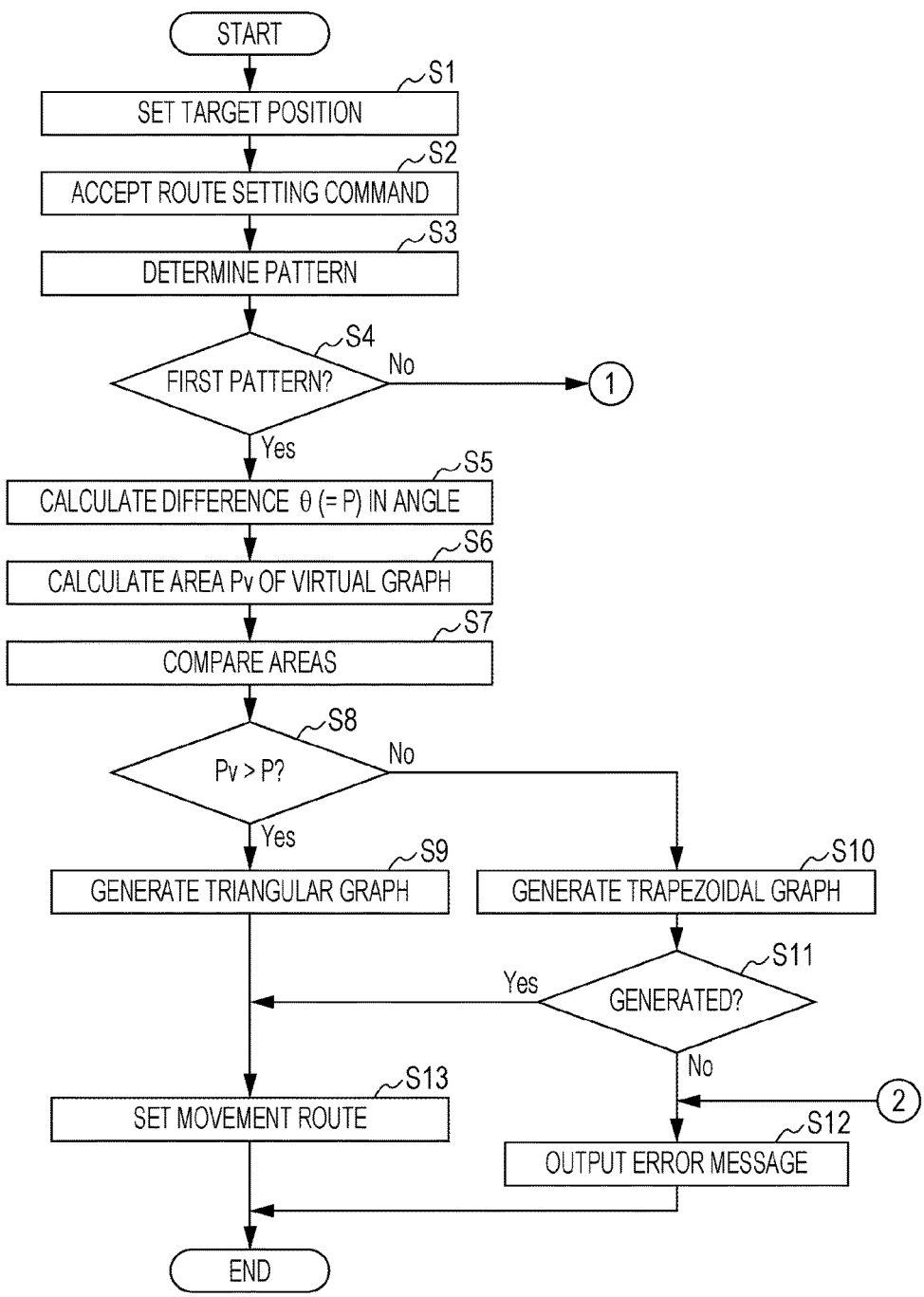
FIG. 9A is a flowchart illustrating an example of the operation of the movement route generating apparatus in the embodiment.
Figure 9B:
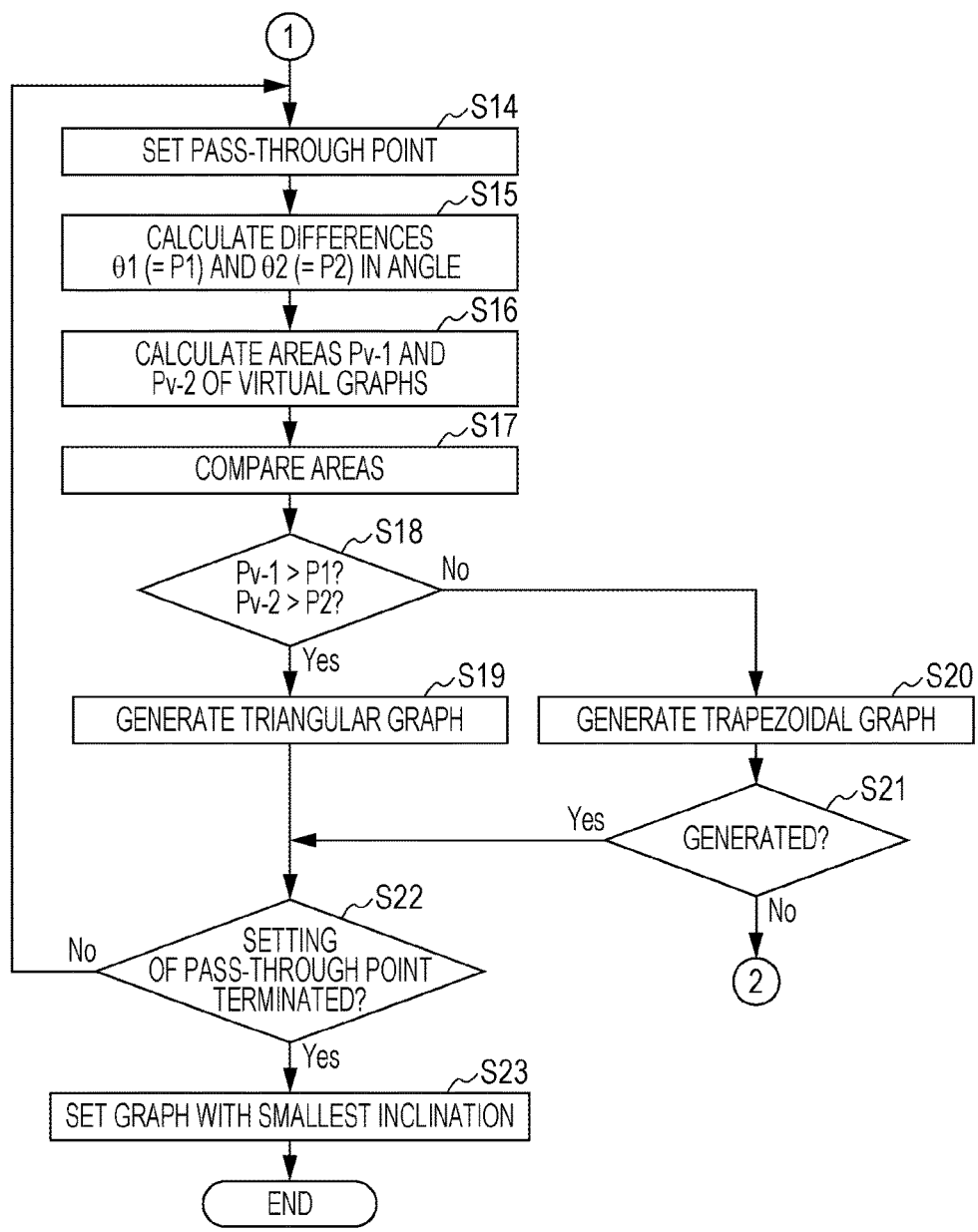
FIG. 9B is a flowchart illustrating an example of the operation of the movement route generating apparatus in the embodiment.

FIGS. 9A and 9B are each a flowchart illustrating an example of the operation of the movement route generating apparatus 100, configured as described above, in the embodiment. The flowchart in FIG. 9A is started when, for example, automatic driving is commanded.

First, the target position setting unit 1 sets a target position to which to move the vehicle by automatic driving (step S1). Then, when the command accepting unit 2 accepts an operation that commands the setting of a movement route (step S2), the pattern determining unit 3 determines which is used to generate a movement route: the first pattern to move the vehicle from the current position to the target position by steering in one direction or the second pattern to move the vehicle from the current position to the target position by steering in two directions, depending on the positional relationship between the current position and the target position (step S3).

If the pattern determining unit 3 determines that the first pattern is to be used (the result in step S4 is Yes), the angle calculating unit 5 calculates the angle θ formed by the direction in which the vehicle at the target position travels compared with the direction in which the vehicle at the current position travels (step S5). Then, the virtual area calculating unit 11 in the graph generating unit 6 calculates the virtual area Pv, which is the area of the virtual graph Gv in an isosceles triangular shape that has the maximum curvature at a midpoint between the current position and the end point of the maximum distance in the two-dimensional space illustrated in FIG. 7 (step S6).

After that, the area comparing unit 12 makes a comparison in size between the virtual area Pv calculated by the virtual area calculating unit 11 and the actual area P equal to the angle θ calculated by the angle calculating unit 5 (step S7). The area comparing unit 12 further determines whether the virtual area Pv is larger than the actual area P (step S8).

If the area comparing unit 12 determines that the virtual area Pv is larger than the actual area P, the graph calculating unit 13 calculates the graph Gs, which is in a triangular shape and has the same area as the actual area P (step S9). If the area comparing unit 12 determines that the virtual area Pv is smaller than the actual area P, the graph calculating unit 13 calculates the graph Gd, which is in a trapezoidal shape and has the same area as the actual area P (step S10).

If the graph calculating unit 13 generates the graph Gd in a trapezoidal shape, the graph calculating unit 13 determines whether it could calculate a graph having the same area as the actual area P (step S11). If the graph calculating unit 13 could not calculate a graph having the same area as the actual area P, the message output unit 30 outputs an error message (step S12). This terminates the processing in the flowchart in FIG. 9A.

If the graph Gs in a triangular shape is calculated in step S9 or the graph Gd, which is in a trapezoidal shape and has the same area as the actual area P, could be calculated in step S10 (the result in step S11 is Yes), the route setting unit 7 sets a travel trajectory represented by the calculated graph Gs or Gd as the movement route of the vehicle (step S13). This terminates the processing in the flowchart in FIG. 9A.

If the pattern determining unit 3 determines in step S4 that the second pattern is to be used (the result in step S4 is No), the pass-through point setting unit 4 sets a pass-through point C between the current position S and the target position E (step S14 in FIG. 9B). Then, the angle calculating unit 5 calculates the first angle θ1, which is formed by the direction in which the vehicle at the pass-through point C travels compared with the direction in which the vehicle at the current position S travels, and the second angle θ2, which is formed by the direction in which the vehicle at the target position E travels compared with the direction in which the vehicle at the pass-through point C travels (step S15).

Then, in the two-dimensional space illustrated in FIG. 8, the first virtual area calculating unit 21 in the graph generating unit 6 calculate the first virtual area Pv-1 in a triangular shape, which is the area of the first virtual graph Gv-1, and the second virtual area calculating unit 24 also in the graph generating unit 6 calculates the second virtual area Pv-2, which is the area of the second virtual graph Gv-2 (step S16).

After that, the first area comparing unit 22 makes a comparison in size between the first virtual area Pv-1 calculated by the first virtual area calculating unit 21 and the first actual area P1 equal to the angle θ1 calculated by the angle calculating unit 5. Similarly, the second area comparing unit 25 makes a comparison in size between the second virtual area Pv-2 calculated by the second virtual area calculating unit 24 and the second actual area P2 equal to the angle θ2 calculated by the angle calculating unit 5 (step S17). The first area comparing unit 22 further determines whether the first virtual area Pv-1 is larger than the first actual area P1. Similarly, the second area comparing unit 25 further determines whether the second virtual area Pv-2 is larger than the second actual area P2 (step S18).

If the first area comparing unit 22 determines that the first virtual area Pv-1 is larger than the first actual area P1, the first graph calculating unit 23 calculates the first graph Gs-1, which is in a triangular shape and has the same area as the first actual area P1 (step S19). Similarly, if the second area comparing unit 25 determines that the second virtual area Pv-2 is larger than the second actual area P2, the second graph calculating unit 26 calculates the second graph Gs-2, which is in a triangular shape and has the same area as the second actual area P2 (step S19).

If the first area comparing unit 22 determines that the first virtual area Pv-1 is smaller than the first actual area P1, the first graph calculating unit 23 calculates the first graph Gd-1, which is in a trapezoidal shape and has the same area as the first actual area P1 (step S20). Similarly, if the second area comparing unit 25 determines that the second virtual area Pv-2 is smaller than the second actual area P2, the second graph calculating unit 26 calculates the second graph Gd-2, which is in a trapezoidal shape and has the same area as the second actual area P2 (step S20).

If the first graph calculating unit 23 generates the first graph Gd-1 in a trapezoidal shape or the second graph calculating unit 26 generates the second graph Gd-2 in a trapezoidal shape, the first graph calculating unit 23 determines whether the first graph calculating unit 23 could calculate a graph having the same area as the first actual area P1 or the second graph calculating unit 26 could calculate a graph having the same area as the second actual area P2 (step S21). If the first graph calculating unit 23 could not calculate a graph having the same area as the first actual area P1 or the second graph calculating unit 26 could not calculate a graph having the same area as the second actual area P2, the message output unit 30 outputs an error message (step S12). This terminates the processing in the flowchart in FIG. 9B.

If the first graph Gs-1, which is in a triangular shape and has the same area as the first actual area P1, or second graph Gs-2, which is in a triangular shape and has the same area as the second actual area P2, is calculated in step S19, or if the first graph Gd-1, which is in a trapezoidal shape and has the same area as the first actual area P1, or the second graph Gd-2, which is in a trapezoidal shape and has the same area as the second actual area P2, could be calculated in step S20 (the result in S21 is Yes), the pass-through point setting unit 4 determines whether the setting of a pass-through point has been terminated (step S22). If the setting of a pass-through point has not been terminated, processing returns to step S14, where the pass-through point setting unit 4 sets a next pass-through point, after which processing in step S15 and later is executed.

If the setting of a pass-through point has been terminated, the route setting unit 7 selects the travel trajectory with the smallest inclination from travel trajectories represented by linking the first graph Gs-1 or Gd-1 and the second graph Gs-2 or Gd-2, which have been calculated with different pass-through points as described above, together, and sets the selected travel trajectory as the travel route for the vehicle (step S23). This terminates the processing in the flowchart in FIG. 9B.

As described above in detail, in this embodiment, it is possible to calculate a travel trajectory on which the degree of change in curvature per unit distance traveled is smallest by generating graphs with the curvature of the travel trajectory and the distance traveled plotted on two axes. A travel trajectory on which the degree of change in curvature is small means that the horizontal angular velocity caused by the steering of the vehicle is low. Therefore, when this type of travel trajectory is calculated, it can be set as a comfortable movement route that lessens burdens applied to occupants.

Figure 10:
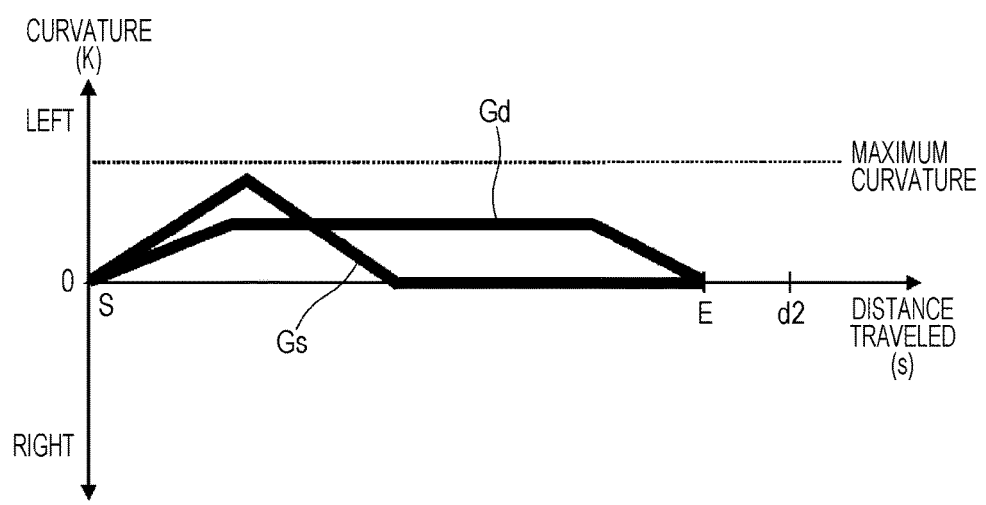
FIG. 10 illustrates a variation of processing by the graph generating unit in the embodiment.

In the above embodiment, as an example of generating a trapezoidal graph, a graph in a trapezoidal shape has been generated so that it has a distance segment that extends while the maximum curvature is maintained (trapezoid shape that has, as the upper base, a predetermined length of line segment set on the line with the maximum curvature). However, the present invention is not limited to this example. For example, as illustrated in FIG. 10, a graph in a trapezoidal shape may be generated so that its upper base is a predetermined length of line segment set on a line with a curvature smaller than the maximum curvature. A trapezoidal graph generated in this way may have inclinations smaller than a triangular graph, as illustrated in FIG. 10.

In the above embodiment, a comparison in size has been made between the area of a virtual graph and an actual area equal to the angle calculated by the angle calculating unit 5, and a triangular or trapezoidal graph has been generated depending on the comparison result. However, the present invention is not limited to this. For example, as illustrated in FIG. 10, triangular graphs and trapezoidal graphs that have an actual area equal to the angle calculated by the angle calculating unit 5 may be generated by trial and error, after which the graph having the smallest inclinations may be selected from these graphs and may be used.

In the above embodiment, as an example of generating a triangular graph, the vertex of an isosceles triangle has been gradually lowered along a straight line (base on the left side) extending from the current position on a virtual graph to its midpoint. However, the present invention is not limited to this example. For example, the vertex of an isosceles triangle on a virtual graph may be lowered beneath.

In the above embodiment, as an example of generating a trapezoidal graph, a graph in a trapezoidal shape has been generated so that it has, as the lower base, a line segment from the current position S to the target position E on the axis of the distance traveled (in the case of the second pattern, a line segment from the current position S to the pass-through point C and a line segment from the pass-through point C to the target position E). However, the present invention is not limited to this. For example, a graph may be generated that includes a straight line on the horizontal axis so as to follow the trapezoid, as with the graph in a triangular shape.

In the above embodiment, the virtual graph Gv has been set, as an example, in which a midpoint is virtually set, on the axis of the distance traveled, between the current position S (or pass-through point C) and the end point of the maximum distance d2. However, the present invention is not limited to this example. For example, the virtual graph Gv may be set so that a midpoint is virtually set, on the axis of the distance traveled, between the current position S (or pass-through point C) and the target position E.

Figure 11A:
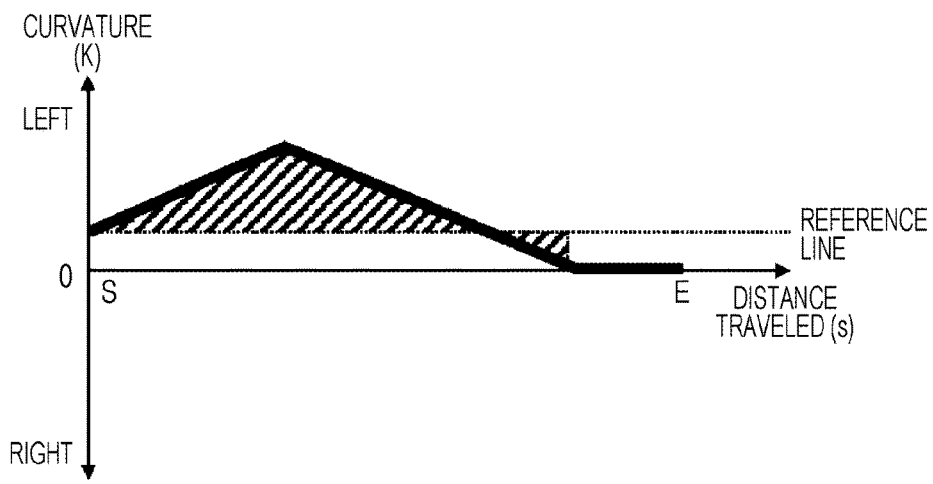
FIGS. 11A and 11B illustrate variations of graphs generated by the graph generating unit and areas under the curves in the embodiment.
Figure 11B:
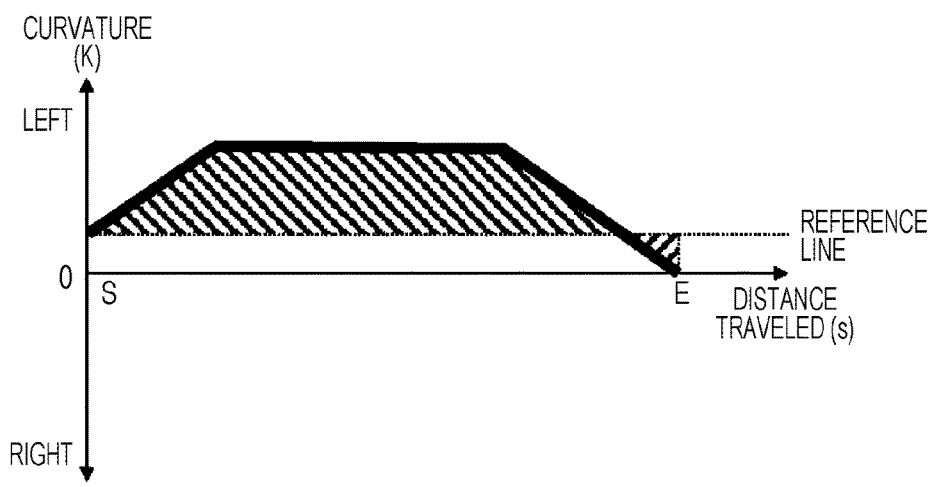

In the above embodiment, a case has been described in which the curvature at the current position is zero (that is, the steering angle is zero). However, the curvature at the current position is not always zero. In particular, when a movement route is calculated again due to the deviation of the vehicle position from the movement route, the curvature is not zero more often than when it is zero. In this case, the area of the graph is the hatched portions in FIG. 11A or 11B. That is, the graph generating unit 6 generates a graph with the smallest inclinations with respect to a reference line set at the curvature at the current position so as to be parallel to the horizontal axis, under the condition that the sum of the area of a triangle or trapezoid formed by a graph above the reference line and the area of a triangle or trapezoid formed by a graph below the reference line is equal to the angle calculated by the angle calculating unit 5.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A movement route generating apparatus comprising:
an angle calculating unit that calculates an angle formed by a direction in which a vehicle at a target position travels compared with a direction in which the vehicle at a current position travels;
a graph generating unit that generates a graph that has most gentle inclinations, each inclination indicating a degree of change in curvature per unit distance traveled, by plotting a curvature of a travel trajectory matching a steering angle of the vehicle and a distance traveled by the vehicle on two axes, under conditions that an area of a graph generated in correspondence to a travel trajectory from the current position to the target position is equal to the angle calculated by the angle calculating unit, and a maximum curvature of a travel trajectory due to a maximum steering angle that the vehicle is capable of controlling is an upper limit; and a route setting unit that sets, as a movement route of the vehicle, a travel trajectory represented by the graph generated by the graph generating unit.

2. The movement route generating apparatus according to claim 1, further comprising:

a pattern determining unit that determines whether to use a first pattern to move the vehicle from the current position to the target position by steering in one direction or a second pattern to move the vehicle from the current position to the target position by steering in two directions, depending on whether an intersection of an axial line of the vehicle at the current position and an axial line of the vehicle at the target position is present between the current position and the target position and whether a distance between the intersection and the target position is shorter than or equal to a predetermined value; and a pass-through point setting unit that, if the pattern determining unit determines that the second pattern is to be used, sets a pass-through point between the current position and the target position; wherein if the pattern determining unit determines that the second pattern is to be used, the angle calculating unit calculates a first angle, which is formed by a direction in which the vehicle at the pass-through point travels compared with the direction in which the vehicle at the current position travels, and also calculates a second angle, which is formed by the direction in which the vehicle at the target position travels compared with the direction in which the vehicle at the pass-through point travels, if the pattern determining unit determines that the second pattern is to be used, the graph generating unit generates a first graph in correspondence to a travel trajectory formed by steering in one direction from the current position to the pass-through point and also generates a second graph in correspondence to a travel trajectory formed by steering in an opposite direction from the pass-through point to the target position, so that the inclinations become most gentle, under conditions that an area of the first graph is equal to the first angle calculated by the angle calculating unit, an area of the second graph equal to the second angle calculated by the angle calculating unit, and the maximum curvature is an upper limit, and the route setting unit sets, as the movement route of the vehicle, a travel trajectory represented by the first graph and second graph generated by the graph generating unit.

3. The movement route generating apparatus according to claim 2, wherein if the pattern determining unit determines that the first pattern is to be used, by taking, as a minimum distance, a slant distance from the current position to the target position and also taking, as a maximum distance, a distance over which the vehicle moves so as to draw a polygonal line from the current position to the target position through an intersection that is formed by a front half line along the axial line of the vehicle at the current position and a back half line along the axial line of the vehicle at the target position, the graph generating unit generates the graph so that a distance traveled from the current position to the target position falls into a range from the minimum distance to the maximum distance.

4. The movement route generating apparatus according to claim 3, wherein the graph generating unit includes a virtual area calculating unit that calculates a virtual area, which is an area of a virtual graph formed in a triangular shape in which a midpoint is virtually set, on an axis of the distance traveled, between the current position and the target position or an end point of the maximum distance, and the curvature is linearly raised up to the maximum curvature in a range from the current position to the midpoint, after which the curvature is linearly lowered down to zero in a range from the midpoint to the target position or the end of the maximum distance, an area comparing unit that makes a comparison in size between the virtual area calculated by the virtual area calculating unit and an actual area equal to the angle calculated by the angle calculating unit, and a graph calculating unit that, if the area comparing unit determines that the virtual area is larger than the actual area, calculates a graph that is analogous to a triangle represented by the virtual graph and has the same area as the actual area, and that, if the area comparing unit determines that the virtual area is smaller than the actual area, calculates a graph formed in a trapezoidal shape having a distance segment that extends while the maximum curvature is maintained and having the same area as the actual area.

5. The movement route generating apparatus according to claim 4, wherein the graph generating unit further includes a message output unit that, if even the trapezoidal graph calculated by the graph calculating unit fails to have the same area as the actual area, outputs an error message indicating that the graph calculating unit could not calculate a trapezoidal graph having the same area as the actual area.

6. The movement route generating apparatus according to claim 2, wherein if the pattern determining unit determines that the second pattern is to be used, by taking, as a minimum distance, a slant distance from the current position to the pass-through point and also taking, as a maximum distance, a distance over which the vehicle moves so as to draw a polygonal line from the current position to the pass-through point through an intersection that is formed by a front half line along the axial line of the vehicle at the current position and a back half line along the axial line of the vehicle at the pass-through point, the graph generating unit generates the first graph so that a distance traveled from the current position to the pass-through point falls into a range from the minimum distance to the maximum distance, and by taking, as a minimum distance, a slant distance from the pass-through point to the target position and also taking, as a maximum distance, a distance over which the vehicle moves so as to draw a polygonal line from the pass-through point to the target position through an intersection that is formed by a front half line along the axial line of the vehicle at the pass-through point and a back half line along the axial line of the vehicle at the target position, the graph generating unit generates the second graph so that a distance traveled from the pass-through point to the target position falls into a range from the minimum distance to the maximum distance.

7. The movement route generating apparatus according to claim 6, wherein the graph generating unit includes a first virtual area calculating unit that calculates a first virtual area, which is an area of a first virtual graph formed in a triangular shape in which a first midpoint is virtually set, on an axis of the distance traveled, between the current position and the pass-through point, and the curvature is linearly raised up to the maximum curvature in a range from the current position to the first midpoint, after which the curvature is linearly lowered down to zero in a range from the first midpoint to the pass-through point, a first area comparing unit that makes a comparison in size between the first virtual area calculated by the first virtual area calculating unit and a first actual area equal to the first angle calculated by the angle calculating unit, and a first graph calculating unit that, if the first area comparing unit determines that the first virtual area is larger than the first actual area, calculates a first graph that is analogous to a triangle represented by the first virtual graph and has the same area as the first actual area, and that, if the first area comparing unit determines that the first virtual area is smaller than the first actual area, calculates a first graph formed in a trapezoidal shape having a distance segment that extends while the maximum curvature is maintained and having the same area as the first actual area.

8. The movement route generating apparatus according to claim 7, wherein the graph generating unit further includes
a second virtual area calculating unit that calculates a second virtual area, which is an area of a second virtual graph formed in a triangular shape in which a second midpoint is virtually set, on an axis of the distance traveled, between the pass-through point and the target position or an end of the maximum distance, and the curvature is linearly raised up to the maximum curvature in a range from the pass-through point to the second midpoint, after which the curvature is linearly lowered down to zero in a range from the second midpoint to the target position or the end of the maximum distance, a second area comparing unit that makes a comparison in size between the second virtual area calculated by the second virtual area calculating unit and a second actual area equal to the second angle calculated by the angle calculating unit, and a second graph calculating unit that, if the second area comparing unit determines that the second virtual area is larger than the second actual area, calculates a second graph that is analogous to a triangle represented by the second virtual graph and has the same area as the second actual area, and that, if the second area comparing unit determines that the second virtual area is smaller than the second actual area, calculates a second graph formed in a trapezoidal shape having a distance segment that extends while the maximum curvature is maintained and having the same area as the second actual area.

9. The movement route generating apparatus according to claim 1, wherein when an operation to command a setting of the movement route is performed, processing by the angle calculating unit, graph generating unit, and route setting unit is executed.

10. The movement route generating apparatus according to claim 9, further comprising a deviation detecting unit that, after the movement route has been set, detects a deviation of a position of the vehicle from the movement route, wherein when the deviation is detected by the deviation detecting unit, processing of the angle calculating unit, graph generating unit, and route setting unit is executed again.

11. A movement route generating method comprising:
a first step in which an angle calculating unit in a movement route generating apparatus calculates an angle formed by a direction in which a vehicle at a target position travels compared with a direction in which the vehicle at a current position travels;

a second step in which a graph generating unit in the movement route generating apparatus generates a graph that has most gentle inclinations, each inclination indicating a degree of change in curvature per unit distance traveled, by plotting a curvature of a travel trajectory matching a steering angle of the vehicle and a distance traveled by the vehicle on two axes, under conditions that an area of a graph generated in correspondence to a travel trajectory from the current position to the target position is equal to the angle calculated by the angle calculating unit, and a maximum curvature of a travel trajectory due to a maximum steering angle that the vehicle is capable of controlling is an upper limit; and a third step in which a route setting unit in the movement route generating apparatus sets, as a movement route of the vehicle, a travel trajectory represented by the graph generated by the graph generating unit.

12. The movement route generating method according to claim 11, further comprising:
determining with a pattern determining unit whether to use a first pattern to move the vehicle from the current position to the target position by steering in one direction or a second pattern to move the vehicle from the current position to the target position by steering in two directions, depending on whether an intersection of an axial line of the vehicle at the current position and an axial line of the vehicle at the target position is present between the current position and the target position and whether a distance between the intersection and the target position is shorter than or equal to a predetermined value; and if the pattern determining unit determines that the second pattern is to be used, setting with a pass-through point setting unit a pass-through point between the current position and the target position; wherein if the pattern determining unit determines that the second pattern is to be used, calculating with the angle calculating unit a first angle, which is formed by a direction in which the vehicle at the pass-through point travels compared with the direction in which the vehicle at the current position travels, and also calculating a second angle, which is formed by the direction in which the vehicle at the target position travels compared with the direction in which the vehicle at the pass-through point travels, if the pattern determining unit determines that the second pattern is to be used, generating with the graph generating unit a first graph in correspondence to a travel trajectory formed by steering in one direction from the current position to the pass-through point and also generating a second graph in correspondence to a travel trajectory formed by steering in an opposite direction from the pass-through point to the target position, so that the inclinations become most gentle, under conditions that an area of the first graph is equal to the first angle calculated by the angle calculating unit, an area of the second graph equal to the second angle calculated by the angle calculating unit, and the maximum curvature is an upper limit, and setting with the route setting unit, as the movement route of the vehicle, a travel trajectory represented by the first graph and second graph generated by the graph generating unit.

13. The movement route generating method according to claim 12, wherein if the pattern determining unit determines that the first pattern is to be used, by taking, as a minimum distance, a slant distance from the current position to the target position and also taking, as a maximum distance, a distance over which the vehicle moves so as to draw a polygonal line from the current position to the target position through an intersection that is formed by a front half line along the axial line of the vehicle at the current position and a back half line along the axial line of the vehicle at the target position, the graph generating unit generates the graph so that a distance traveled from the current position to the target position falls into a range from the minimum distance to the maximum distance.

14. The movement route generating method according to claim 13, wherein the step of generating with the graph generating unit includes
calculating with a virtual area calculating unit a virtual area, which is an area of a virtual graph formed in a triangular shape in which a midpoint is virtually set, on an axis of the distance traveled, between the current position and the target position or an end point of the maximum distance, and the curvature is linearly raised up to the maximum curvature in a range from the current position to the midpoint, after which the curvature is linearly lowered down to zero in a range from the midpoint to the target position or the end of the maximum distance,
making with an area comparing unit a comparison in size between the virtual area calculated by the virtual area calculating unit and an actual area equal to the angle calculated by the angle calculating unit, and
calculating with a graph calculating unit, if the area comparing unit determines that the virtual area is larger than the actual area, a graph that is analogous to a triangle represented by the virtual graph and has the same area as the actual area, and, if the area comparing unit determines that the virtual area is smaller than the actual area, calculating a graph formed in a trapezoidal shape having a distance segment that extends while the maximum curvature is maintained and having the same area as the actual area.

15. The movement route generating method according to claim 14, wherein the step of generating with the graph generating unit further includes outputting with a message output unit, if even the trapezoidal graph calculated by the graph calculating unit fails to have the same area as the actual area, an error message indicating that the graph calculating unit could not calculate a trapezoidal graph having the same area as the actual area.

16. The movement route generating method according to claim 12, wherein if the pattern determining unit determines that the second pattern is to be used,
by taking, as a minimum distance, a slant distance from the current position to the pass-through point and also taking, as a maximum distance, a distance over which the vehicle moves so as to draw a polygonal line from the current position to the pass-through point through an intersection that is formed by a front half line along the axial line of the vehicle at the current position and a back half line along the axial line of the vehicle at the pass-through point, generating with the graph generating unit the first graph so that a distance traveled from the current position to the pass-through point falls into a range from the minimum distance to the maximum distance, and
by taking, as a minimum distance, a slant distance from the pass-through point to the target position and also taking, as a maximum distance, a distance over which the vehicle moves so as to draw a polygonal line from the pass-through point to the target position through an intersection that is formed by a front half line along the axial line of the vehicle at the pass-through point and a back half line along the axial line of the vehicle at the target position, generating with the graph generating unit the second graph so that a distance traveled from the pass-through point to the target position falls into a range from the minimum distance to the maximum distance.

17. The movement route generating method according to claim 16, wherein the step of generating with the graph generating unit includes
calculating with a first virtual area calculating unit a first virtual area, which is an area of a first virtual graph formed in a triangular shape in which a first midpoint is virtually set, on an axis of the distance traveled, between the current position and the pass-through point, and the curvature is linearly raised up to the maximum curvature in a range from the current position to the first midpoint, after which the curvature is linearly lowered down to zero in a range from the first midpoint to the pass-through point,
making with a first area comparing unit a comparison in size between the first virtual area calculated by the first virtual area calculating unit and a first actual area equal to the first angle calculated by the angle calculating unit, and
calculating with a first graph calculating unit, if the first area comparing unit determines that the first virtual area is larger than the first actual area, a first graph that is analogous to a triangle represented by the first virtual graph and has the same area as the first actual area, and, if the first area comparing unit determines that the first virtual area is smaller than the first actual area, calculating a first graph formed in a trapezoidal shape having a distance segment that extends while the maximum curvature is maintained and having the same area as the first actual area.

18. The movement route generating method according to claim 17, wherein the step of generating with the graph generating unit further includes
calculating with a second virtual area calculating unit a second virtual area, which is an area of a second virtual graph formed in a triangular shape in which a second midpoint is virtually set, on an axis of the distance traveled, between the pass-through point and the target position or an end of the maximum distance, and the curvature is linearly raised up to the maximum curvature in a range from the pass-through point to the second midpoint, after which the curvature is linearly lowered down to zero in a range from the second midpoint to the target position or the end of the maximum distance,
making with a second area comparing unit a comparison in size between the second virtual area calculated by the second virtual area calculating unit and a second actual area equal to the second angle calculated by the angle calculating unit, and
calculating with a second graph calculating unit, if the second area comparing unit determines that the second virtual area is larger than the second actual area, a second graph that is analogous to a triangle represented by the second virtual graph and has the same area as the second actual area, and, if the second area comparing unit determines that the second virtual area is smaller than the second actual area, calculating a second graph formed in a trapezoidal shape having a distance segment that extends while the maximum curvature is maintained and having the same area as the second actual area.

19. The movement route generating method according to claim 11, wherein when an operation to command a setting of the movement route is performed, processing by the angle calculating unit, graph generating unit, and route setting unit is executed.

20. The movement route generating method according to claim 19, further comprising detecting with a deviation detecting unit, after the movement route has been set, a deviation of a position of the vehicle from the movement route, wherein when the deviation is detected by the deviation detecting unit, processing of the angle calculating unit, graph generating unit, and route setting unit is executed again.

* * * * *